United States Patent [19]

Wallouch

[11] 3,798,043

[45] Mar. 19, 1974

[54] HIGH STRENGTH REFRACTORY CONCRETE

[75] Inventor: Rudolph W. Wallouch, Lewiston, N.Y.

[73] Assignee: Airco, Inc., New York, N.Y.

[22] Filed: Dec. 6, 1972

[21] Appl. No.: 312,466

Related U.S. Application Data

[63] Continuation-in-part of Ser. No. 261,122, June 8, 1972, abandoned.

[52] U.S. Cl. .................... 106/64, 106/104, 106/117
[51] Int. Cl. ............................................. C04b 35/02
[58] Field of Search ..................... 106/64, 104, 117

[56] References Cited
UNITED STATES PATENTS 1,462,991 7/1923 Taylor ................................. 106/117
3,125,454 3/1964 Dolph et al. ......................... 106/64
3,226,240 12/1965 Crowley ............................... 106/64

*Primary Examiner*—James E. Poer
*Attorney, Agent, or Firm*—H. Hume Mathews; Edmund W. Bopp

[57] ABSTRACT

A refractory concrete of improved strength made from calcium-aluminate cement, a refractory aggregate of ferro-chromium slag, and as an additive, powdered boron phosphate. According to the method of the invention the graded slag is admixed with the phosphate additive and aluminate cement to form a concrete grog, which is subsequently fired in air to temperatures of 1,000°C or higher. A ceramic-type bond is thereby formed, transforming the concrete rapidly into a dense refractory body.

12 Claims, No Drawings

HIGH STRENGTH REFRACTORY CONCRETE

This application is a continuation-in-part of my co-pending application Ser. No. 261,122, filed June 8, 1972 for "High Strength Refractory Concrete", now abandoned which application is assigned to the assignee of the instant application.

BACKGROUND OF INVENTION

This invention relates generally to high strength refractory concrete and more specifically relates to such materials as are utilized under high temperature operating conditions.

The usefulness of concrete made with common Portland cement is limited to temperatures up to about 650°C. When Portland cement-type (structural) concrete is heated above 700°C, the cement becomes dehydrated and loses its strength and structural integrity. In many important applications of these materials, however, structural integrity at elevated temperatures is of paramount significance. For example, durability of the material being utilized is perhaps the single most important characteristic of an acceptable sideblock in an Acheson type furnace for graphitizing carbon products. Not only are replacement costs of conventional concrete sideblocks extremely high, but in addition an early breakdown of sideblocks has a direct bearing on the operating cost of graphitizer units. If sideblocks rupture at top graphitizing temperatures, insulating mix will run through the gap in the sidewall and cause temporary problems in operating the graphitizer. The life cycle of sideblocks is especially short in graphitizing units where the blocks are exposed to above average temperatures (of the order of 1,000° to 1,200°C) when making premium graphite electrodes.

In the past, concrete for high temperature applications (refractory concrete) has been prepared from refractory aggregates such as crushed firebrick, together with a high temperature cement. The usual high temperature cement thus employed is a calcium-aluminate cement, such as the cements of the type known to the industry under the trade name "Luminate," or under such specific product designations as "Alcoa CA-25." A typical such calcium-aluminate cement thus includes by weight percentage the following components: $Al_2O_3$ 79.0; CaO 18.0; $SiO_2$ 0.1; MgO 0.4, and $Fe_2O_3$ 0.3. These calcium-aluminate cements start about 700°C to form a fired bond with the refractory aggregate. At temperatures above 800°C, the hydraulic bond is supplemented by a ceramic bond which makes such material superior to Portland cement-type structural concrete. In practice, however, it is found that when the dehydrated compounds are heated much beyond the specified temperatures a portion of the combined water is lost, in consequence of which a decrease in the bonding strength ensues within the concrete.

In accordance with the foregoing, it may be regarded as an object of the present invention to provide a refractory concrete and method for production thereof, which concrete possesses a high fired strength at temperatures of the order of 1,000°C, and which in specified formulations possesses improved strength up to at least 1,200°C.

SUMMARY OF INVENTION

Now, in accordance with the present invention the foregoing object, and others as will become apparent in the course of the ensuing specification, are achieved in a refractory concrete of high fired strength, comprising an admixture of graded ferro-chromium slag and a calcium-aluminate cement. Addition of several parts per hundred by weight of powdered boron phosphate, furthermore, have been found to considerably increase the strength of the fired refractory concrete, most particularly at temperatures in the range of 1,000°C to 1,200°C. The ferro-chromium slag utilized as the refractory aggregate is a composition resulting from production of ferrochrome alloys, and is available from Airco Alloys & Carbide Division of Airco, Inc., Niagrara Falls, N.Y, and Charleston, S.C. The said aggregate, depending upon the specific metallurgical process from which it is derived has a typical composition range of 25–40% MgO; 20–50% $SiO_2$; and 10–40% $Al_2O_3$; together with less than about 15 percent by weight of such constituents as Cr, $Cr_2O_3$, CaO, FeO, C, and S.

DESCRIPTION OF PREFERRED EMBODIMENT

In order to illustrate the effectiveness of compositions in accordance with the invention, refractory products comprising a calcium-aluminate cement and the ferro-chromium slags of the invention, were prepared and compared to refractory products based upon conventional blast furnace slag and calcium-aluminate cements. The typical blast furnace slags so utilized comprised the following components: 40–50% CaO; 30–40% $SiO_2$; 8–18% $Al_2O_3$. All aggregates were crushed and sized to form graded grog and combined with Alcoa CA–25 calcium-aluminate cement as hydraulic bond material. Concrete samples were then formed and fired in 100°C increments up to 1,200°C and the fired compressive strengths determined. As may now be seen by examining Table I, hereinbelow, the incorporation of ferro-chromium slag into the mixed configuration greatly improved the high temperature properties of the concrete as compared to a formulation using blast furnace slag as aggregate.

Specifically it will be seen by comparing in Table I the results for Mix 1 with those yielded by Mixes 2 and 3, that the ferro-chromium slag in combination with the calcium-aluminate cement greatly out-performs blast furnace slag where used as an aggregate. The aggregate used in all instances to prepare Mixes 1, 2 and 3 was well graded from coarse to fines and contained at least 50 percent of sized slag which would pass the 14-mesh screen. The cement-to-aggregate ratio in the mix in all instances was 1:4, and the water to cement ratio, W/C, was equal to 0.60. In each instance the compressive strength test was run on refractory cylindrical samples which had been heat treated up to the indicated temperature of 1,200°C in 100° increments, with 48 hours hold at each of the stated incremental temperatures. It may be noted that Mix 2 differed from Mix 3 in that the former was derived from production of ferrochrome silicon alloy, while the latter was generated in the production of so-called high carbon ferrochrome. The former slags generally include by weight percent approximately 30–40% MgO; 30–50% $SiO_2$; and 10–25% $Al_2O_3$; the latter slags (i.e., similar to Mix 3) generally include by weight percent about 25–35% MgO; 20–35% $SiO_2$, and 20–40% $Al_2O_3$.

TABLE I

Compressive Strength (psi) of 2" Diameter × 2" Refractory Concrete Cylinders Which Have Been Heat treated up to 1200°C in 100°C increments with 48 Hours Hold at Each Temperature

| Heat Treatment Temp (°C) | Cumulated Days | Compressive Stength (psi) | | | |
|---|---|---|---|---|---|
| | | Mix 1 Blast Furnace Slag | Mix 2 Ferro-Chromium Slag | Mix 3 Ferro-Chromium Slag | Mix 4 Same as Mix 2 plus Boron Phosphate |
| 125 | 2 | 4207 | 4514 | 6490 | 5514 |
| 200 | 4 | 4349 | 4869 | 6493 | 5133 |
| 300 | 6 | 2830 | 4417 | 4978 | 4760 |
| 400 | 8 | 2813 | 4808 | 6110 | 4463 |
| 500 | 10 | 3437 | 4256 | 5630 | 4511 |
| 600 | 12 | 2737 | 4582 | 4827 | 4125 |
| 700 | 14 | 1731 | 4447 | 4814 | 3802 |
| 800 | 16 | 2134 | 3313 | 4159 | 3377 |
| 900 | 18 | 1828 | 2712 | 2740 | 3080 |
| 1000 | 20 | 1907 | 2503 | 2825 | 4756 |
| 1100 | 22 | 1754 | 2470 | 2321 | 6870 |
| 1200 | 24 | 1713 | 3069 | 3659 | 9343 |

LEGEND TO MIXES:
Mix 1: Graded blast furnace slag and Alcoa's calcium-aluminate CA–25 cement.
Mixes 2 & 3: Graded ferro-chromium slags and Alcoa's calcium-aluminate CA–25 cement.
Mix 4: Same as Mix 2 with 3.85 parts of boron phosphate ($BPO_4$) per hundred parts of dry ingredients.

It will be noted from examination of Table I that Mixes 2 and 3, while clearly in all respects superior to Mix 1, do not have exceedingly high strength characteristics at the higher temperature range of about 900°C to 1,200°C. In this connection it may be noted that it has in the past been attempted to increase the strength of refractories of the present general type by addition of certain common fluxes — such as sodium or potassium compounds. Unfortunately these cited fluxes have had a detrimental effect on the set of the cement because of their high solubility in water. In accordance with the present invention, however, it has now been found that the addition of small quantities by weight of powdered boron phosphate ($BPO_4$) to the mix, as specified in Table I, results in outstanding strength properties in the fired refractory — particularly at the higher temperature range of use. In particular, as may now be seen from Table I, the mix 4 differs from Mix 2 only in that 3.85 parts per hundred by weight of the dry ingredients of the additive boron phosphate is now present. As may be seen from the table, compressive strengths as high as 9,343 psi have been obtained where the concrete was fired up to 1,200°C over a period of 24 days. Generally, less than about 5 pph by weight of the dry ingredients are found to be a suitable addition range for the $PBPO_4$, with a preferred range of addition being for about 3 to 4 pph. While the phenomena pursuant to which the marked improvement occurs is not completely understood, it appears that some sort of ceramic bond is formed transforming the concrete quite rapidly into a dense ceramic body. The resulting refractory material when used, for example, in sideblock applications is found to have outstanding non-spalling and non-cracking characteristics even after repeated heating to 1,200°C and subsequent cooling.

While the present invention has been particularly set forth in terms of specific embodiments thereof, it will be understood in view of the instant disclosure that numerous variations upon the teaching are now enabled to those skilled in the art, which variations yet reside in the scope of the present invention. Accordingly, the invention is to be broadly construed, and limited only by the scope and spirit of the claims now appended thereto.

I claim:

1. A composition for firing into a refractory concrete comprising in aqueous admixture a high temperature calcium-aluminate cement; and as a refractory aggregate a ferro-chromium slag.

2. The composition of claim 1 wherein said slag comprises by weight percent 25–40% MgO; 20–50% $SiO_2$, and 10–40% $Al_2O_3$.

3. The composition of claim 1 wherein the cement to aggregate ratio is approximately 1:4, and the water to cement ratio approximately 0.6.

4. A composition in accordance with claim 1, further including as a high temperature flux, less than 5 parts per hundred by weight of the solid components of boron phosphate.

5. A method of forming a high strength refractory concrete comprising: admixing graded ferro-chromium slag and a high temperature calcium-aluminate cement with water; forming a desired concrete structure from the aqueous admixture; and thereupon firing said concrete structure to at least 1,000°C in air.

6. A method in accordance with claim 5, further including adding to said admixture small quantities of powdered boron phosphate as a high temperature flux.

7. A method in accordance with claim 6 wherein said structures are fired up to temperature of 1,200°C.

8. A method according to claim 6 wherein said boron phosphate is added in quantities less than about 5 parts per hundred by weight of the solid components of said admixture.

9. A method according to claim 8 wherein said boron phosphate is added in quantities of between 3 to 4 parts per hundred by weight.

10. A method according to claim 9 wherein the cement-to-aggregate ratio in the admixture is approximately 1:4, and the water-to-cement ratio is approximately 0.6.

11. The fired product resulting from the process of claim 5.

12. The fired product resulting from the process of claim 6.

* * * * *